(12) United States Patent
Skjæveland et al.

(10) Patent No.: US 10,130,021 B2
(45) Date of Patent: Nov. 20, 2018

(54) LOCKING DEVICE FOR A WEAR PART OF A SOIL-WORKING IMPLEMENT

(71) Applicant: KVERNELAND GROUP OPERATIONS NORWAY AS, Kvernaland (NO)

(72) Inventors: Magne Skjæveland, Klepp St. (NO); John Karstein Tønnessen, Sandnes (NO)

(73) Assignee: KVERNELAND GROUP OPERATIONS NORWAY AS, Kverneland (NO)

( * ) Notice: Subject to any disclaimer, the term of this patent is extended or adjusted under 35 U.S.C. 154(b) by 0 days.

(21) Appl. No.: 15/124,173

(22) PCT Filed: Feb. 25, 2015

(86) PCT No.: PCT/NO2015/050042
§ 371 (c)(1),
(2) Date: Sep. 7, 2016

(87) PCT Pub. No.: WO2015/137820
PCT Pub. Date: Sep. 17, 2015

(65) Prior Publication Data
US 2017/0013769 A1     Jan. 19, 2017

(30) Foreign Application Priority Data
Mar. 12, 2014 (NO) .................................. 20140318

(51) Int. Cl.
*A01B 35/22* (2006.01)
*A01B 15/06* (2006.01)
*A01B 23/02* (2006.01)

(52) U.S. Cl.
CPC .............. *A01B 15/06* (2013.01); *A01B 23/02* (2013.01); *A01B 35/225* (2013.01)

(58) Field of Classification Search
CPC ........ A01B 35/225; A01B 15/06; A01B 23/02
(Continued)

(56) References Cited

U.S. PATENT DOCUMENTS

| 1,443,835 A | 1/1923 | Buikema |
| 1,520,825 A | 12/1924 | Kinlaw |

(Continued)

FOREIGN PATENT DOCUMENTS

| EP | 1 259 105 B1 | 4/2006 |
| FI | 18463 A | 4/1939 |

(Continued)

OTHER PUBLICATIONS

Norwegian Search Report, dated Sep. 10, 2014, 2 pages.
Australian Office Action dated May 23, 2017 as issued in corresponding Australian Patent Application No. 2015230044.

*Primary Examiner* — Matthew D. Troutman
(74) *Attorney, Agent, or Firm* — Foley & Lardner LLP

(57) ABSTRACT

A locking device (3) for a wearing part (2) detachably attached to a soil-working working element (1) by means of quick-coupling elements (11, 21), wherein a locking element (31) attached to the working element (1) includes an end portion (312) projecting from the working element (1) and being provided with an engagement section (313) arranged to engage with a lock-receiving element (22) arranged on a lee-side face (2a) of the wearing part (2).

8 Claims, 2 Drawing Sheets

(58) Field of Classification Search
USPC .................................. 172/762, 750, 753
See application file for complete search history.

(56) References Cited

U.S. PATENT DOCUMENTS

| | | | | |
|---|---|---|---|---|
| 2,258,932 | A | | 10/1941 | Jacobs |
| 2,757,595 | A | * | 8/1956 | Clifford ............... A01B 35/225 172/762 |
| 2,877,061 | A | * | 3/1959 | Blackwood ............ A01B 39/22 172/732 |
| 3,061,021 | A | | 10/1962 | Shader |
| 3,220,489 | A | * | 11/1965 | Repka .................. A01B 35/225 172/750 |
| 3,223,452 | A | * | 12/1965 | Krekeler ................ E21C 35/19 299/109 |
| 3,563,318 | A | * | 2/1971 | Eberhardt ............ A01B 35/225 172/750 |
| 4,611,418 | A | * | 9/1986 | Launder ................ E02F 9/2841 172/750 |
| 4,779,686 | A | | 10/1988 | Ryan |
| 5,007,484 | A | * | 4/1991 | Johanson ............... A01B 23/02 172/1 |
| 6,289,996 | B1 | * | 9/2001 | Parish ................. A01B 35/225 172/730 |
| 6,315,058 | B1 | * | 11/2001 | Birkenbach .......... A01B 35/225 172/753 |
| 6,571,884 | B1 | * | 6/2003 | Horvath ............... A01B 35/225 172/730 |
| 6,585,058 | B2 | * | 7/2003 | Zaun ................... A01B 35/225 172/750 |
| 6,814,151 | B1 | * | 11/2004 | Peck .................... A01B 35/225 172/750 |
| 7,124,836 | B2 | * | 10/2006 | Poutre ................. A01B 35/225 172/750 |
| 7,255,179 | B2 | * | 8/2007 | Pollard ................ A01B 35/225 172/683 |
| 8,528,238 | B2 | | 9/2013 | SkjæVeland |

FOREIGN PATENT DOCUMENTS

| | | |
|---|---|---|
| GB | 1 215 839 A | 12/1970 |
| NO | 332031 B1 | 5/2012 |
| SE | 362462 B | 12/1973 |
| WO | WO 2007/112923 A1 | 10/2007 |
| WO | WO 2013/176553 A1 | 11/2013 |

* cited by examiner

LOCKING DEVICE FOR A WEAR PART OF A SOIL-WORKING IMPLEMENT

The invention relates to a locking device for a wearing part, more specifically a wearing part that is detachably attached to a soil-working working element by means of quick-coupling elements.

BACKGROUND

When using a wearing part which is attached to a soil-working working element with a quick coupling, especially of the socket-and-pin coupling type, as is described in the applicant's own EP patent 1259105 and NO patent 332031, for example, incorrect use of the implement of which the working element forms part may lead to the wearing part coming loose from the quick coupling. Especially when the wearing part is of the cultivator-tine type in the shape of a wide goosefoot share, the loss of such a wearing part during transport-driving on roads may be a hazard to other vehicles and may result in serious damage if the wearing part of this kind is hit by a vehicle.

U.S. Pat. No. 4,779,686 A is disclosing a so-called ploughshare assembly including a ploughshare and a support for the ploughshare, the support extending from the top face of the ploughshare. A pair of opposed internal edges defines a recess in the ploughshare. A holder formation on the support includes a foot portion and a pair of grooves adjacent the foot to receive the internal edges of the ploughshare so that when the ploughshare is in its working position on the support the foot engages underside the ploughshare and retains it in place. A resilient latch in the form of a length of wire bent to define a hook, and a rearwardly extending portion in the form of an eye is releasably mounted to the support positionable to engage a detent face on the ploughshare to prevent excessive forward movement of the ploughshare with respect to the support.

SUMMARY OF THE INVENTION

The invention has for its object to remedy or reduce at least one of the drawbacks of the prior art or at least provide a useful alternative to the prior art.

The object is achieved through the features that are specified in the description below and in the claims that follow.

The terms "front", "rear", "upper", "lower" and the like relate to the direction of travel and the positions of the elements in a normal operative state of the implement.

The invention provides a locking device arranged on a working element for a soil-working implement and arranged to engage with a portion of a wearing part, preferably by means of a snap-lock device in an area of the wearing part that lies shielded relative to the material flow created when the implement is in function. In a preferred embodiment, the locking device formed as an elongated resilient locking element which is attached at a first end portion to the working element and which, in a freely projecting second end portion, includes an engagement section arranged to engage with a lock-receiving element, for example a recess, on the wearing part. A front portion of the engagement section preferably forms a ramp, that is to say an inclined plane, on which the wearing part slides when the wearing part is being connected to a wearing-part holder, so that the front portion of the locking element is deflected out of its unstressed normal position until the wearing part has been moved into its normal attached position on the wearing-part holder and the engagement section of the locking element is in engagement with the corresponding side face of the lock-receiving element of the wearing part. Similarly, a rear portion of the engagement section is preferably ramp-shaped for the wearing part to be able to, when being detached, displace the second end portion of the locking element away from its engagement with the lock-receiving element. Said rear portion of the engagement section has a pitch angle relative to the direction of movement of the wearing part, when this is being fitted and removed, that is so large that a considerable push force will have to be applied to the wearing part for the locking device to be released from the wearing part.

The locking device is preferably formed from a plate material, wherein the engagement section may have been formed by, for example, parts of the second end portion of the locking device having been bent, by part of the second end portion of the locking device having been pressed out by cold or hot forming, or by an elevation element having been attached to the second end portion of the locking device by means of a fixing method suitable therefor (welding, soldering, gluing, screwing or the like).

The invention is defined by the independent claim. The dependent claims define advantageous embodiments of the invention.

The invention relates, more specifically, to a locking device for a wearing part detachably attached to a soil-working working element by means of quick-coupling elements, wherein a locking element, is fixed to the working element and includes a resilient end portion, which projects from the working element and is provided with an engagement section arranged to engage with a lock-receiving element, characterized in that said lock-receiving element is a recess arranged in a bottom and rear side area of the wearing part, said area being shielded relative to a material flow passing over the wearing part when the soil-working element is in function.

The end portion may be tensioned in the operative position of the engagement section. An advantage of this is that the locking device may engage with the wearing part as a snap-lock device.

The lock-receiving element may be a recess arranged in the lee-side face of the wearing part, where the recess may be formed as a bottom side of a transverse elevation on the top side of the wearing part, arranged for shielding a wearing-part mounting. An advantage of this is that the lock-receiving element is formed in the same operation that forms another function element on the wearing part.

The engagement section may include a front portion formed as a ramp arranged for sliding contact with a portion of the lee-side face of the wearing part when the wearing part is being connected to a wearing-part mounting arranged on the working element.

The engagement section may include a rear portion formed as a ramp arranged for sliding contact with a portion of the lee-side face of the wearing part when the wearing part is being disconnected from a wearing-part mounting arranged on the working element. An advantage of this is that the wearing part can be detached without the locking device first having to be deactivated.

The locking element may be formed from a springy plate material. An advantage of this is that the locking device may be produced rationally.

The engagement section may be formed as a bent portion of a plate material. An advantage of this is that the locking device may be formed of just one component.

BRIEF DESCRIPTION OF THE DRAWINGS

In what follows, an example of a preferred embodiment is described, which is visualized in the accompanying drawings, in which.

DETAILED DESCRIPTION

Figure 1:
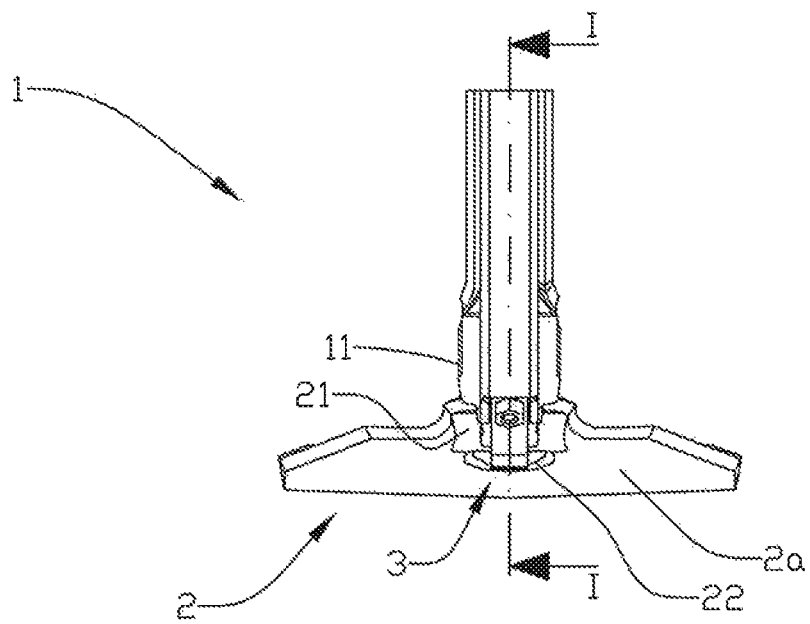
FIG. 1 shows a view of a portion of a working element viewed in the working direction of the working element, a locking device according to the invention being in engagement with the bottom side of a wearing part.

In the figures, the reference numeral 1 indicates a working element, shown here as a lower portion of a cultivator tine for working the soil. A wearing part 2, shown here as a cultivator point, also called a goosefoot share, is releasably attached to the working element 1. The wearing part 2 includes a quick-coupling element 21 formed as a socket arranged to slidingly engage with a corresponding pin of a quick-coupling element 11, also called a wearing part mounting, which is fixed to the working element 1. A locking device 3, which is fixed to the working element 1 projects forwards along a lee-side face 2a of the wearing part 2, that is to say along a bottom side and a rear side of the wearing part 2 where the locking device 3 lies shielded to a substantial degree from the mass flow passing over the wearing part 2 when the working element 1 is in function.

On its lee-side face 2a, the wearing part 2 includes a lock-receiving element 22 shown here as a recess which is formed, here, by shaping a transverse elevation 23 on the top side of the wearing part 2 arranged to shield the wearing-part mounting 11. The lock-receiving element 22 may be provided by machining, cold or warm forming or the like, and is necessarily not connected to the presence of said elevation 23. The lock-receiving element 22 may also be formed as an elevation, not shown, projecting from the lee-side face 2a.

Figure 2:
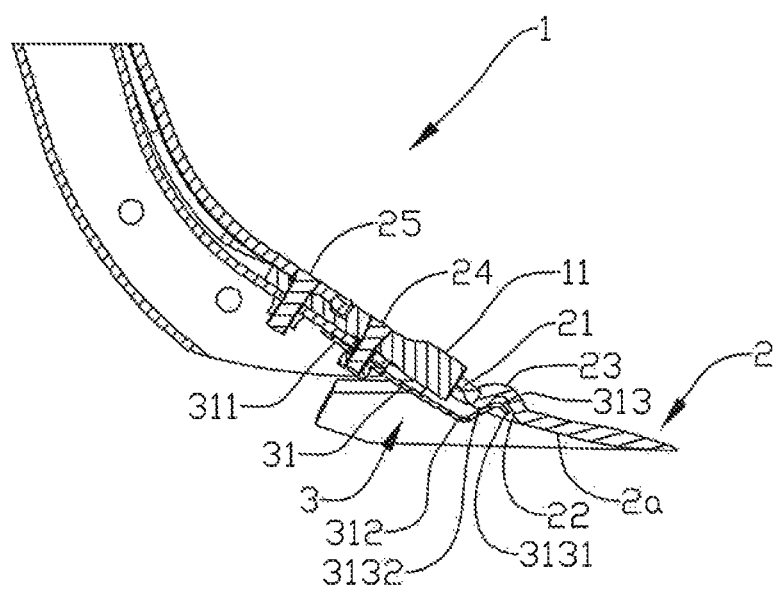
FIG. 2 shows a longitudinal section I-I according to FIG. 1 of the working element with the locking device in engagement with the wearing part.
Figure 3:
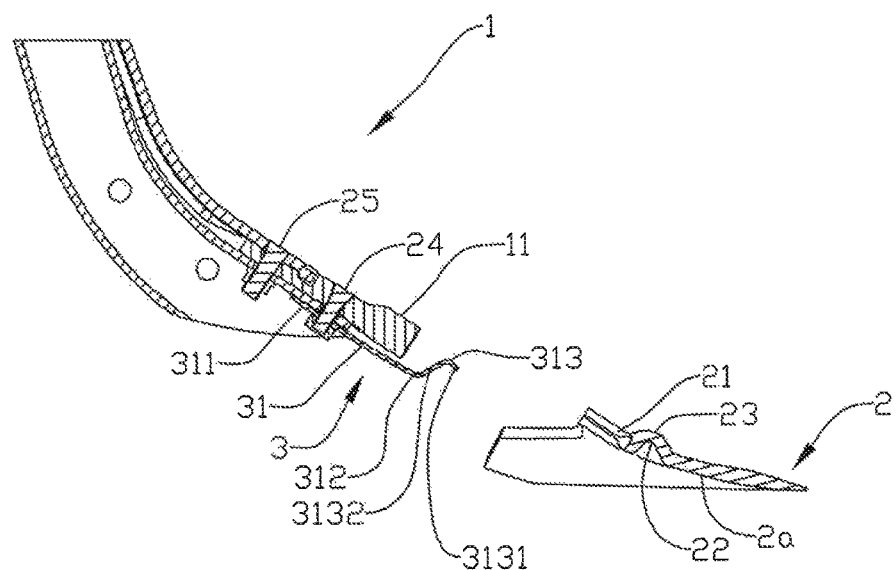
FIG. 3 shows a longitudinal section I-I according to FIG. 1 of the working element with the locking device, but in which, for the sake of exposition, the wearing part has been pulled away from the working element.
Figure 4:
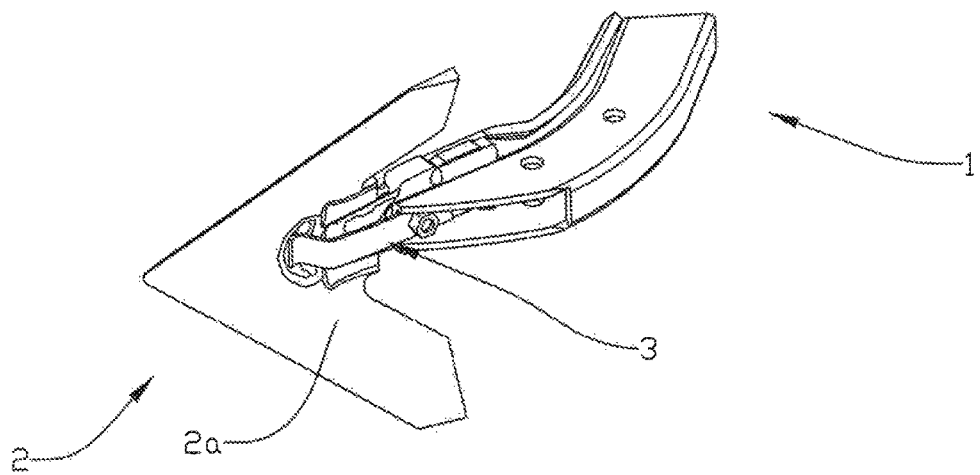
FIG. 4 shows, in perspective, a portion of the working element with the locking device in engagement with the wearing point, viewed from underneath the working element.

Reference is now made especially to FIGS. 2 and 3, in which a longitudinal section through the working element 1 elucidates the invention in its simplest embodiment. The locking device 3 is formed of a locking element 31 formed from a plate material which is fixed in a first, rear end portion 311 to a fixing bolt 24 which, together with a second fixing bolt 25, constitutes fixing means for the wearing-part mounting 11. A second, front end portion 312 of the locking element 31 projects freely forwards from the wearing-part mounting 11 and includes a raised engagement section 313 arranged to engage in a locking manner in the lock-receiving element 22 of the wearing part 2. The engagement section 313 includes front and rear ramp-shaped portions 3131, 3132, that is to say having the shape of inclined planes. In the embodiment shown, the engagement section 313 is formed by bending the plate material from which the locking element 31 is formed, but the invention is not limited to an engagement section 313 formed in this way. The engagement section 313 may be formed as a pressed-out or forged elevation, not shown, or the engagement section 313 may form a separate element, not shown, which is fixed to the locking element 31 by gluing, soldering, welding or by the use of fasteners like screws, rivets and so on.

In the embodiment shown, the locking element 31 is formed from a springy plate material.

When there is a need to ensure that a wearing part 2 on a working element 1 will not fall off, the locking element 31 is fixed to the working element 1 with a fixing bolt 24 suitable therefor. For this operation the wearing part 2 is advantageously removed from the working element 1.

When a wearing part 2 is then attached to the working element 1, the wearing part 2 is connected by its quick-coupling element 21 to the corresponding quick-coupling element of the working element 1, as the wearing part 2 is slid onto the wearing-part mounting 11. During this movement, the second end portion 312 of the locking element 31 is pressed downwards as a portion of the lee-side face 2a of the wearing part 2 slides along the front ramp-shaped portion 3131 of the engagement section 313 until the engagement section 313 locks into the lock-receiving element 22 on the lee-side face 2a of the wearing part 2 by at least the rear, ramp-shaped portion 3132 resting against a corresponding side face of the lock-receiving element 22.

When the wearing part 2 has a tendency to come loose from its engagement with the wearing-part mounting 11, the engagement section 313 will prevent this from developing in such a way that the wearing part 2 falls off the working element 1, by the pressure of the rear ramp-shaped portion 3132 of the engagement section 313 against the wearing part 2 providing a force component acting to push in the direction of the coupling direction of the quick-coupling elements 11, 21.

When a wearing part 2 is to be removed from the working element 1, it is knocked loose from the wearing-part mounting 11. During this releasing displacement the second end portion 312 of the locking element 31 is pressed downwards as a portion of the lee-side face 2a of the wearing part 2 slides along the rear ramp-shaped portion 3132 of the engagement section 313 until the engagement section 313 is free from the lock-receiving element 22 on the lee-side face 2a of the wearing part 22.

The invention claimed is:

1. A locking device for a wearing part configured to detachably attach to a soil-working working element by quick-coupling elements, the locking device comprising:
   a locking element fixed to the soil-working working element and having a resilient end portion projecting forward and past a leading edge of the soil-working working element, wherein the resilient end portion includes an engagement section; and
   a lock-receiving element configured to engage with the engagement section of the resilient end portion,
   wherein the lock-receiving element is a recess arranged in a lee-side face of the wearing part,
   wherein the lee-side face is shielded relative to a material flow passing over the wearing part when the soil-working working element is in function,
   wherein the engagement section includes a front portion formed as a ramp configured for sliding contact with a portion of the lee-side face of the wearing part when the wearing part is being connected to one of the quick-coupling elements arranged on the soil-working working element, and
   wherein the engagement section includes a rear portion formed as a ramp arranged for sliding contact with a portion of the lee-side face of the wearing part when the wearing part is being disconnected from the one of the quick-coupling elements arranged on the soil-working working element.

2. The locking device according to claim 1, wherein the resilient end portion is configured to be tensioned in an operative position of the engagement section.

3. The locking device according to claim 1, wherein the recess is formed as a bottom side of a transverse elevation on a top side of the wearing part and configured to shield the quick-coupling elements.

4. The locking device according to claim 1, wherein the locking element is formed from a springy plate material.

5. The locking device according to claim 1, wherein the engagement section is formed as a bent portion of a plate material.

6. The locking device according to claim 4, wherein the engagement section is formed as a bent portion of the springy plate material.

7. The locking device according to claim 1,
wherein the soil-working working element comprises a cultivator tine, and
wherein the wearing part comprises a cultivator point.

8. The locking device according to claim 1, wherein the quick-coupling elements comprise a socket formed in the wearing part and a pin arranged on the soil-working working element.

* * * * *